E. A. LAMPHIER.
OPTICAL INSTRUMENT.
APPLICATION FILED APR. 26, 1917.
1,283,815.
Patented Nov. 5, 1918.
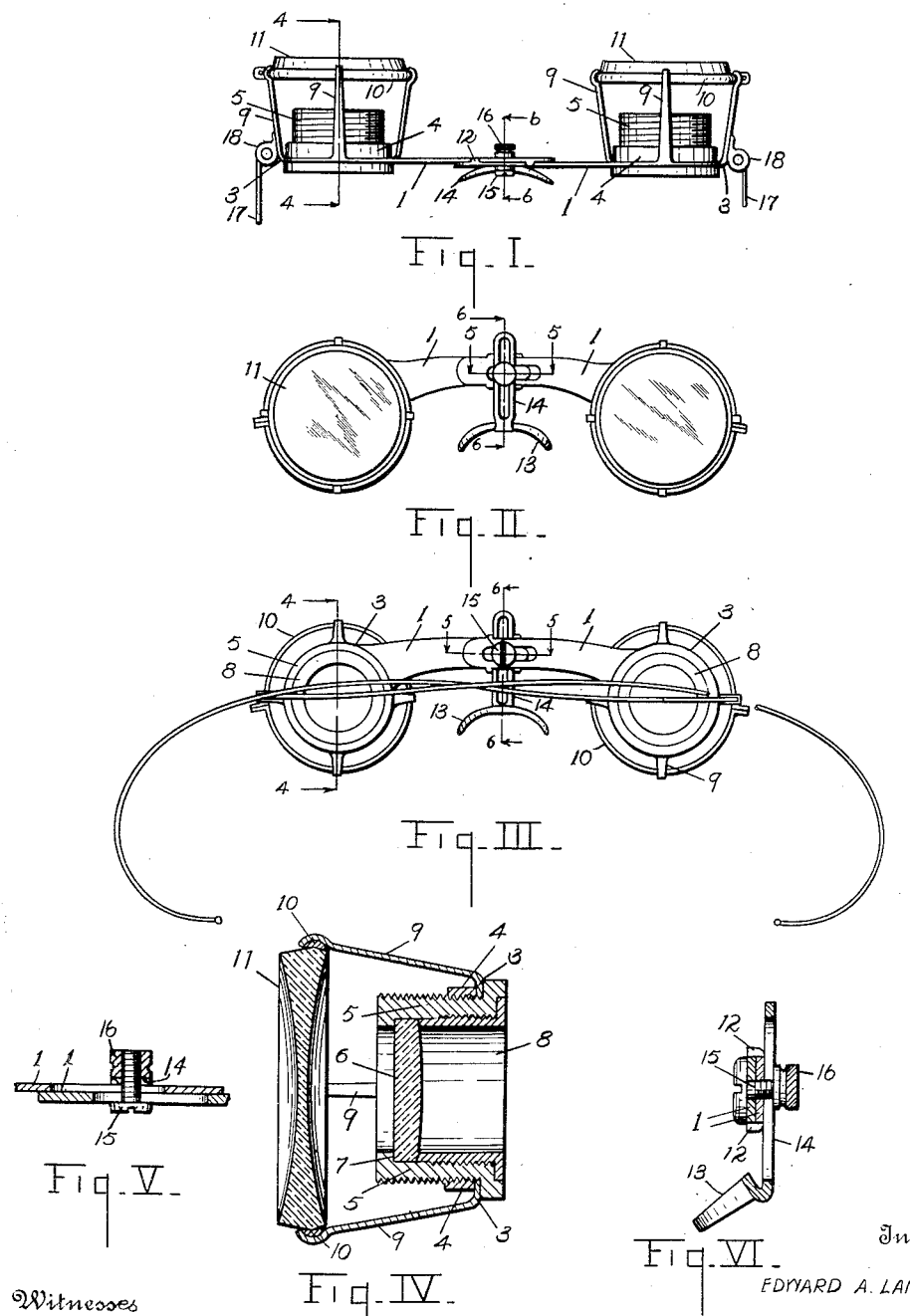
Witnesses
O. A. Robbers.
Lem Gilman
Inventor
EDWARD A. LAMPHIER.
By Chappell & Earl
Attorneys

UNITED STATES PATENT OFFICE.

EDWARD A. LAMPHIER, OF KALAMAZOO, MICHIGAN.

OPTICAL INSTRUMENT.

1,283,815.     Specification of Letters Patent.     Patented Nov. 5, 1918.

Application filed April 26, 1917. Serial No. 164,716.

*To all whom it may concern:*

Be it known that I, EDWARD A. LAMPHIER, a citizen of the United States, residing at Kalamazoo, Michigan, have invented certain new and useful Improvements in Optical Instruments, of which the following is a specification.

This invention relates to optical instruments.

My invention is particularly designed for the use of patrons of moving picture theaters. When an observer is placed too close to the screen upon which the moving pictures are projected, the pictures appear to him to be enlarged to more than the natural size and the imperfections in the film become noticeable. Furthermore, on account of the size to which the images are enlarged, it is necessary for the observer to turn his eyes or head from side to side in order to cover the entire field of the screen. These things, combined with the fact that the "flicker" caused by the successive projections of the images upon the screen, is more noticeable the closer the observer is seated to the screen, produce a disagreeable sensation and strain upon the eyes of the observer. The result of this is that many patrons refuse to be seated in the forward part of a moving picture theater, and this causes, in effect, an appreciable reduction in the seating capacity of the theater which, from a financial standpoint, is very undesirable.

The objects of my invention are to overcome these difficulties by:

First, providing an optical instrument which will reduce the size of the images thrown upon the screen, but, at the same time, insure a sufficient illumination of the image to prevent them from appearing dim to the eye of the observer.

Second, to provide an instrument of this kind which may be mounted in pairs upon a spectacle frame or other suitable support whereby the field of vision is increased and the eyes relieved from any strain.

Third, to provide an improved frame similar to a spectacle frame upon which my improved optical instruments may be mounted, means being provided for easily adjusting the distance between the eye pieces.

Further objects and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is illustrated in the accompanying drawing forming a part of this specification, in which:

Figure I is a plan view of my improved instruments.

Fig. II is a front elevation thereof.

Fig. III is a rear elevation thereof.

Fig. IV is an enlarged detail section taken on a line corresponding to line 4—4 of Fig. I and Fig. III.

Fig. V is an enlarged detail section taken on a line corresponding to line 5—5 of Figs. II and III.

Fig. VI is an enlarged detail section taken on a line corresponding to line 6—6 of Figs. I, II and III.

In the drawing similar reference characters refer to similar parts throughout the several views, and the sectional views are taken looking in the direction of the little arrows at the ends of the section lines.

Referring to the drawing, the reference characters 1 indicate complementary frame members provided with the annular eye piece support 3. An internally threaded sleeve 4 is secured to the outer side of each of the supports 3 by solder or otherwise to receive the externally threaded barrel 5 for the eye piece 6. The eye piece is clamped against an annular shoulder 7 of the barrel 5 by means of a sleeve 8 which has screw threaded engagement with the interior of the sleeve 5. In practice, the inner bore of the sleeve 8 is blackened to prevent the reflection of light therefrom.

The annular eye piece support 3 has formed integral therewith at spaced intervals, the forwardly extending spring objective supporting arms 9, the outer ends of which are conformed to embrace the rim 10 of the objective 11. In Fig. IV this objective is illustrated as comprising a double concave lens and in practice this has been found to be most suitable, as the field of vision covered by this lens is comparatively large and the objective and eye piece may be arranged in very close relation whereby the length of the instrument is reduced to a minimum. My invention, however, contemplates the use of any diverging lens as an objective. In Fig. IV, the eye piece is illustrated as comprising a plano-convex lens but it is to be understood that any converging lens may be used in place of the lens illustrated.

The objective and the eye piece are arranged so that the distance therebetween is less than the focal length of said lenses.

The inner ends of the frame members 1 are slotted and provided with guide lugs 12 which engage the edges of the coacting member to hold the two arms in alinement.

The nose piece 13 is provided with an upwardly extending slotted standard 14. The slotted standard 14 and the inner ends of the frame members are held in their adjusted position by means of a clamping screw 15 which passes through the slot therein and is provided with a nut 16.

In Figs. I and III, I have shown bows 17 pivotally secured to ears 18 which are mounted upon one of the supports 9.

While I have illustrated the embodiment of my invention which is peculiarly adapted to the use of individual patrons of moving picture theaters, it is to be clearly understood that my invention is not limited to the details of construction shown therein, but may be modified by providing other forms of support, and lenses, which come within the scope of the appended claims.

Having thus described my invention, what I claim as new and desire to secure by Letters Patent is:

1. In a structure of the class described, the combination of a pair of longitudinally slotted frame members provided with annular eye piece supports having forwardly projecting objective supporting arms, a nose piece having a slotted standard, a clamping screw disposed through said slotted frame members and slotted nose piece standard for securing the parts in their adjusted relation, internally shouldered barrels threaded for adjustment into said eye piece supports, converging eye pieces mounted in said barrels against said shoulders, clamping sleeves threaded into said barrels to hold said eye pieces against said shoulders, and diverging objectives supported by said forwardly projecting arms, said objectives and eye pieces being separated a distance less than the focal length of either.

2. In a structure of the class described, the combination of a pair of longitudinally slotted frame members provided with annular eye piece supports having forwardly projecting objective supporting arms, a nose piece having a slotted standard, a clamping screw disposed through said slotted frame members and slotted nose piece standard for securing the parts in their adjusted relation, barrels threaded for adjustment into said eye piece supports, converging eye pieces mounted in said barrels, and diverging objectives supported by said forwardly projecting arms, said objectives and eye pieces being separated a distance less than the focal length of either.

3. In a structure of the class described, the combination of a pair of frame members provided with annular eye piece supports having forwardly projecting objective supporting arms, a nose piece, means for securing said frame members and nose piece standard in their adjusted relation, barrels threaded for adjustment into said eye piece supports, converging eye pieces mounted in said barrels, and diverging objectives supported by said forwardly projecting arms, said objectives and eye pieces being separated a distance less than the focal length of either.

4. In a structure of the class described, the combination of a pair of frame members provided with annular eye piece supports having forwardly projecting objective supporting arms, converging eye pieces mounted in said eye piece supports, and diverging objectives supported by said forwardly projecting arms, said objectives and eye pieces being separated a distance less than the focal length of either.

5. In a structure of the class described, the combination of a pair of frame members provided with annular eye piece supports having forwardly projecting objective supporting arms, converging eye pieces mounted in said eye piece supports, and diverging objectives supported by said forwardly projecting arms.

6. In a structure of the class described, the combination of a pair of frame members provided with eye piece supports with forwardly projecting objective supporting means thereon, barrels threaded for adjustment in said eye piece supports, converging eye pieces mounted in said barrels and diverging objectives supported by said objective supporting means.

In witness whereof, I have hereunto set my hand and seal in the presence of two witnesses.

EDWARD A. LAMPHIER. [L. S.]

Witnesses:
LUELLA G. GREENFIELD,
MARGARET L. GLASGOW.